(12) United States Patent
Hutchins

(10) Patent No.: US 11,844,319 B1
(45) Date of Patent: Dec. 19, 2023

(54) SUPPORT CLIP FOR POTTED PLANT SUPPORT STAKES

(71) Applicant: Jeffrey Wayne Hutchins, Brattleboro, VT (US)

(72) Inventor: Jeffrey Wayne Hutchins, Brattleboro, VT (US)

( * ) Notice: Subject to any disclaimer, the term of this patent is extended or adjusted under 35 U.S.C. 154(b) by 216 days.

(21) Appl. No.: 17/464,522

(22) Filed: Sep. 1, 2021

Related U.S. Application Data

(60) Provisional application No. 63/125,337, filed on Dec. 14, 2020.

(51) Int. Cl.
   *A01G 9/12* (2006.01)
   *F16B 2/10* (2006.01)

(52) U.S. Cl.
   CPC .............. *A01G 9/124* (2013.01); *F16B 2/10* (2013.01)

(58) Field of Classification Search
   CPC ........... A01G 9/124; A01G 9/122; F16B 2/10; B25G 1/06; B25G 3/12; B25G 1/002; G09F 17/00; G09F 2017/075; A01B 1/026
   See application file for complete search history.

(56) References Cited

U.S. PATENT DOCUMENTS

| 2017/0127621 A1* | 5/2017 | Harger | A01G 9/124 |
| 2017/0354098 A1* | 12/2017 | Paolucci | F16C 11/106 |
| 2019/0239449 A1* | 8/2019 | Eddins | A01G 9/12 |

FOREIGN PATENT DOCUMENTS

| EP | 0058738 A1 * | 9/1982 | A01G 9/124 |
| WO | WO-2006074235 A2 * | 7/2006 | B25F 1/00 |

* cited by examiner

*Primary Examiner* — Brady W Frazier
*Assistant Examiner* — Nicole Paige MacCrate
(74) *Attorney, Agent, or Firm* — Sandy Lipkin

(57) ABSTRACT

A support clip for a potting container for plants and seedlings that is attachable to the side of the potting container. The support clip has attached thereto a receptacle for the placement therein of support stakes for a plant or seedling in the container. The receptacle remains on the outside of the potting container, thereby preserving space inside of the potting container for soil and amendments for the plant or seedling. The support clip and receptacle are connected by an angle adjustment knob that allows for the angle at which support stakes placed in the receptacle can be placed relative to the plant or seedling planted therein such that the support stakes are appropriate for the growth stage of the plant or seedling.

2 Claims, 4 Drawing Sheets

US 11,844,319 B1

SUPPORT CLIP FOR POTTED PLANT SUPPORT STAKES

REFERENCE TO PRIOR APPLICATION

This application claims priority of the provisional patent application 63/125,338, filed Dec. 14, 2020 entitled GREEN THUMB GROW STICK by Jeffrey Wayne Hutchins.

BACKGROUND OF THE INVENTION

Field of the Invention

The field of this invention relates generally to the field of supports for growing plants, and in particular toward clips that can be attached to all types of potted plants to provide an external, adjustable space for the placement therein of vertical supports at variable angles to support any plant growing in the pot.

Description of the Prior Art

Gardening for pleasure and business is a very common human activity. People grow plants for beauty, food and medicine. Sometimes plants are planted in the ground, but often they are planted in containers, such as pots. Even some plants that are planted in the ground, sometimes start their growth in containers, such as pots.

Many plants, as they grow, require supports for optional growth. Plants planted in the ground are often tied to stakes or trellises, but are very often supported with stakes that are inserted into the ground near the plant or seedling so it can be attached thereto or used as a boundary so that even when not attached, the seedling or plant can have its growth supported in a vertical direction around the boundary of the stakes.

When plants are in containers, such as pots, there is only a limited space in the dirt. Placing stakes directly into this dirt can not only disrupt the underground root system of a plant planted therein, but it also takes up valuable space where soil, fertilizer and other forms of amendments can be placed. Additionally, damp dirt can rot and degrade the bottom of some types of support stakes.

It is the object of the instant invention to provide an apparatus that can be used for plants in containers, such as pots, that can attach to the container and provide a receptacle on the outside of the container into which stakes can be placed without disrupting the soil in the container.

It is a further object of the instant invention to provide that the apparatus be flexible in its angle such that stakes placed therein can be positioned appropriately for the height of the plant as it grows.

SUMMARY OF THE INVENTION

The basic embodiment of the present invention teaches a support clip for supporting support stakes for potted plants comprising: a top hook for placement on the rim of a container for potted plants, said top hook having a vertical flange and a horizontal flange such that said vertical flange rests against an inside wall of said container and said horizontal flange rests on said rim of said container; a support leg attached to said top hook wherein said support leg extends downward from said top hook such that said support leg rests against an outside wall of said container; a receptacle containing an interior space for the placement therein of a support stake wherein said receptacle is hingedly attached to said top hook and said support leg at a position where said top hook and said support leg connect; and an adjustable knob at said position where said top hook and said support leg connect that allows for said receptacle to vary its angle relative to said container.

An alternate embodiment teaches a method for supporting a plant inside a planting container comprising the steps of: acquiring a container for the planting of a seed, seedling or plant therein, said container having an inner wall, an outer wall and a top rim extending along a perimeter of said container; planting a seed, seedling or plant into said container; attaching one or more support clips to a rim of said container, said one or more support clips further comprising: a top hook for placement on said rim of said container, said top hook having a vertical flange and a horizontal flange positioned substantially perpendicular to each other; a support leg attached to said top hook wherein said support leg extends downward from said top hook; a receptacle containing an interior space wherein said receptacle is hingedly attached to said top hook and said support leg at a position where said top hook and said support leg connect; and an adjustable knob at said position where said top hook and said support leg connect that allows for said receptacle to vary its angle relative to said container wherein said vertical flange of said top hook rests against said inner wall of said container and said horizontal flange rests on said top rim of said container; placing of a support stake into said interior space of said receptacle to support said seed, seedling or plant; and adjusting the angle of said receptacle to said support leg as desired as to direct the position of said support stake.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
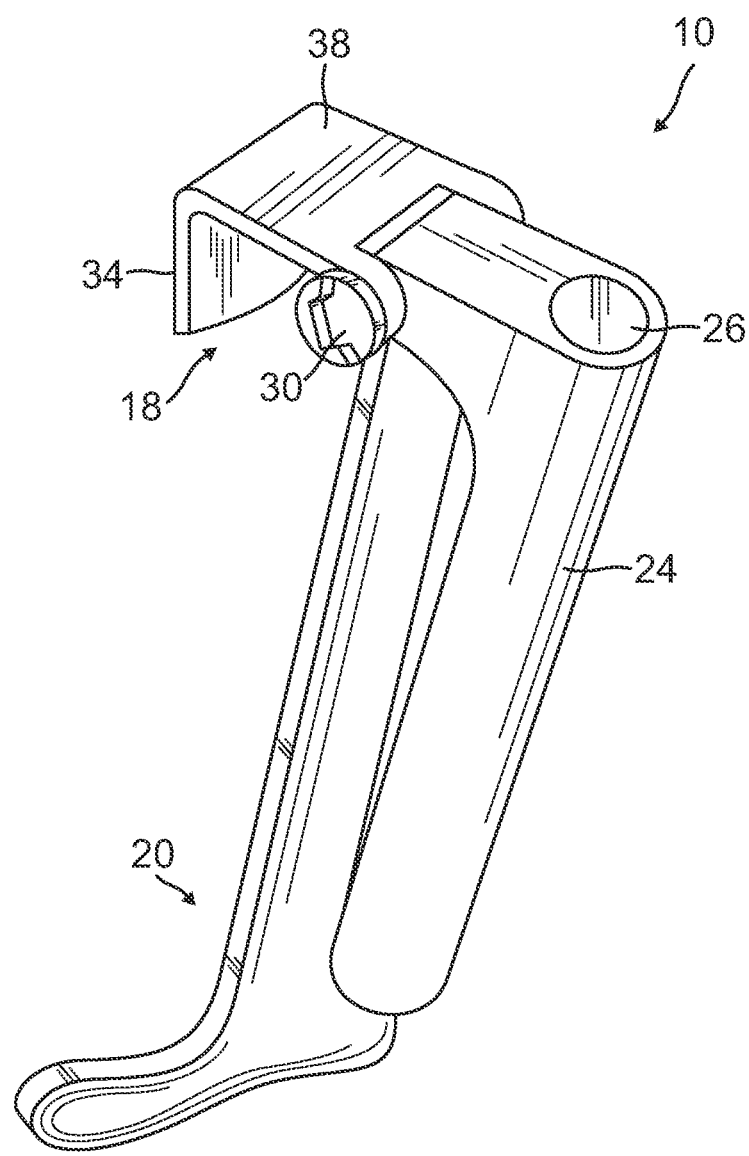
FIG. 1 is a side perspective view of one of the support clips of the instant invention.
Figure 2:
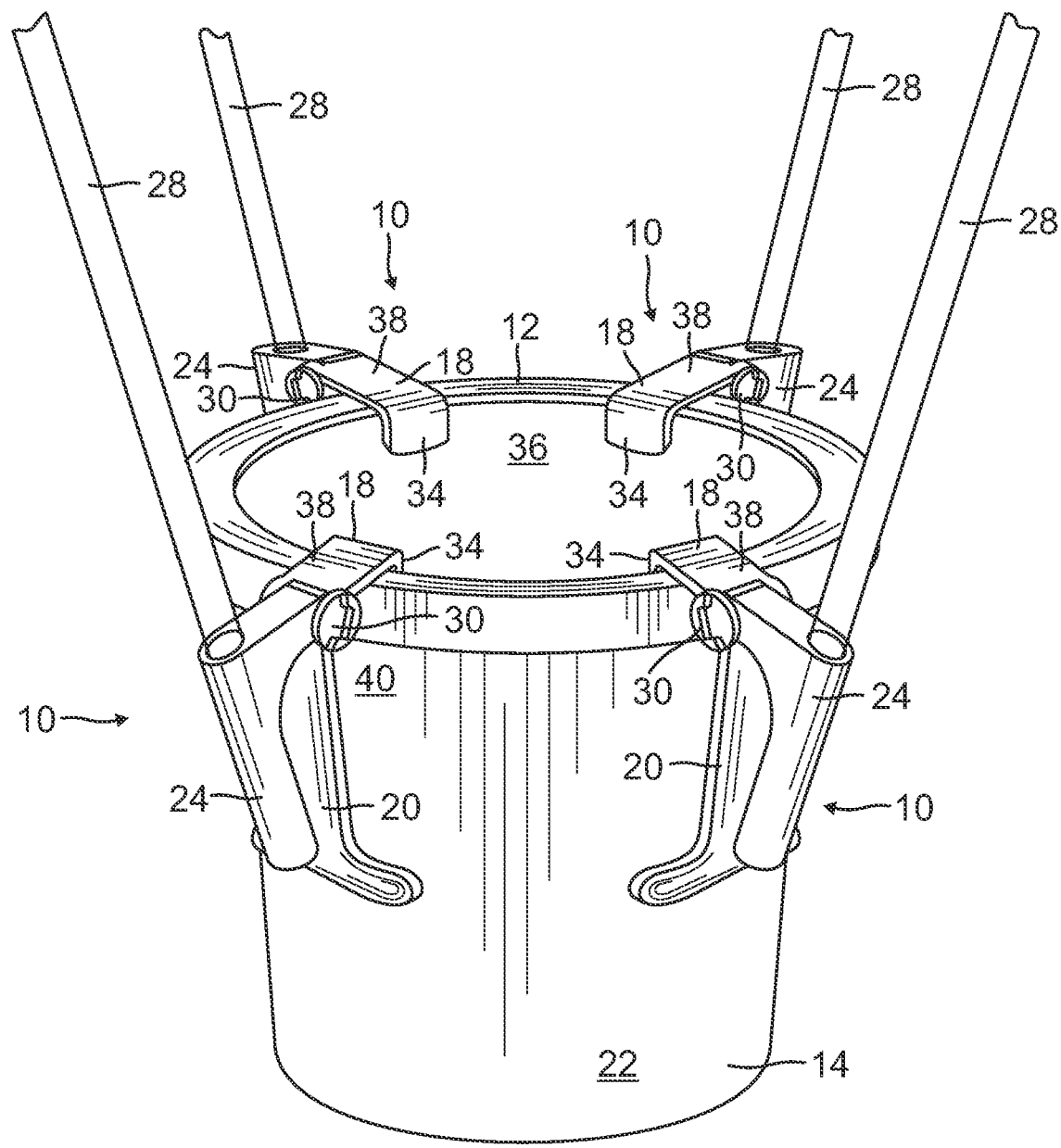
FIG. 2 is a top front perspective view of a potting container with four of the support clips of the instant invention attached thereto with support stakes placed therein.
Figure 3:
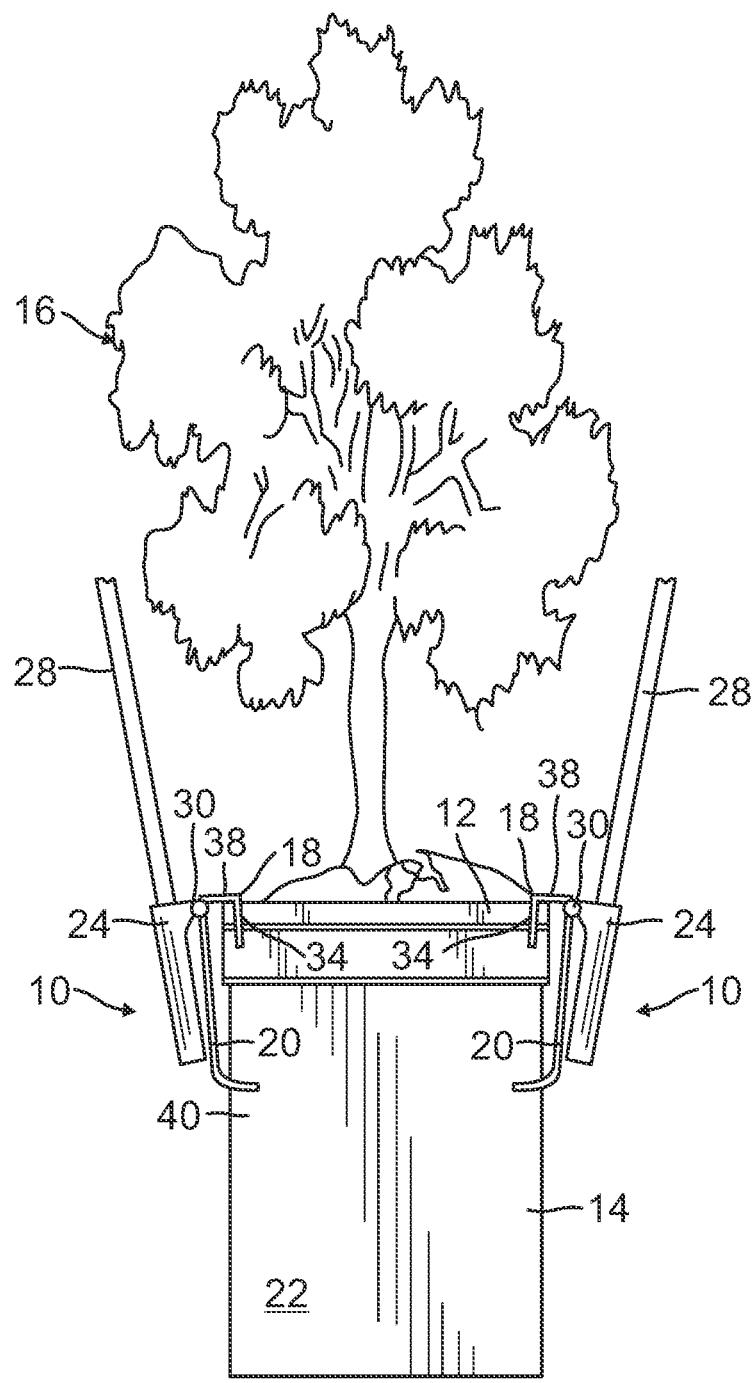
FIG. 3 is a side view of a potting container where two of the support clips of the instant invention attached thereto with support stakes placed therein and a plant shown planted inside of the potting container.
Figure 4:
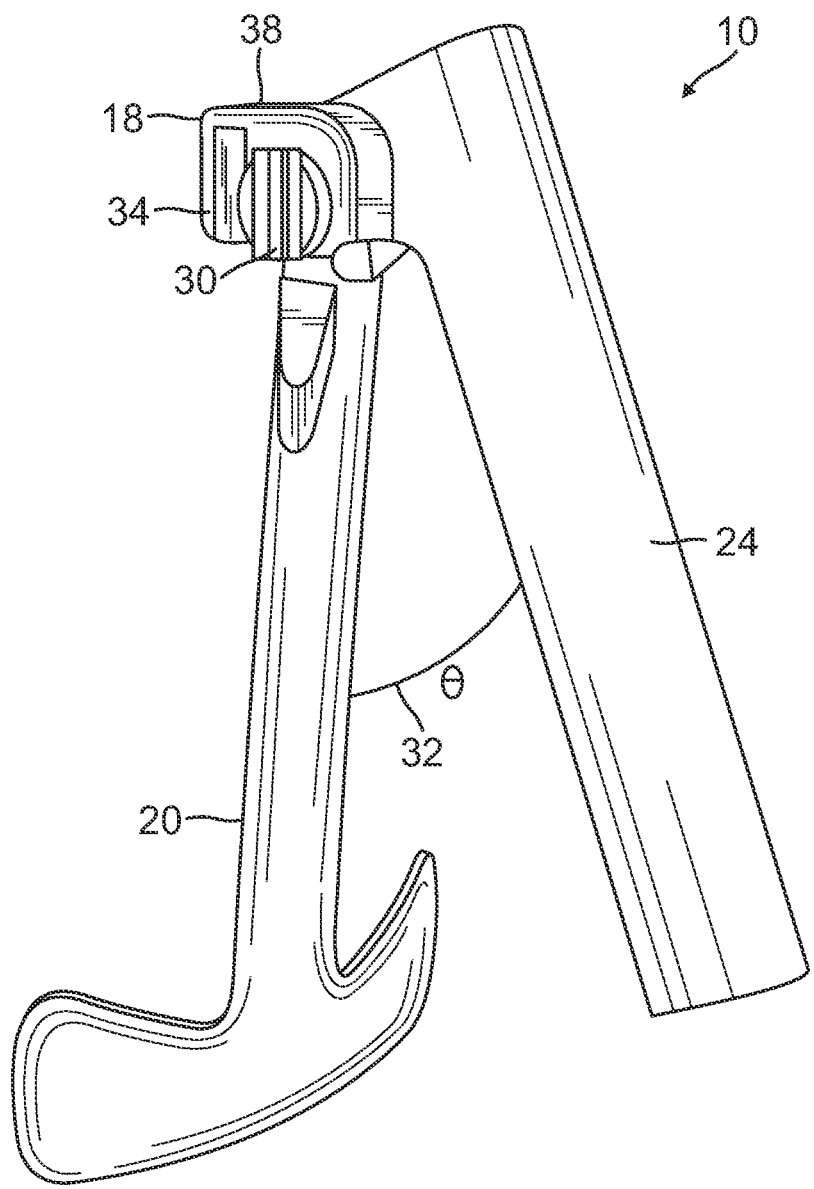
FIG. 4 is a view similar to FIG. 1 but with the support receptacle moved toward a different angle.

Turning to the drawings, the preferred embodiment is illustrated and described by reference characters that denote similar elements throughout the several views of the instant invention.

The preferred embodiment of the instant invention provides for a support clip 10 to be placed on the rim 12 of a potting container 14 that contains a plant or seedling 16. The support clip 10 includes a generous hook 18 that attaches to the rim 12 of the potting container 14. The hook 18 is attached to a support leg 20 that rests against the side 22 of a potting container 14. At the top of the support leg 20 and proximate the hook is an attached, angle-adjustable receptacle that has a space 26 therein for the placement of a support stake 28 such as a dowel or other suitable support. Where the receptacle 24 meets the hook 18 and support leg 20 is an adjustment knob 30 that allows for the angle between the support leg 20 and the pot 14 that is appropriate to support the growth stage of the plant or seedling 16 planted therein.

To use, a container 14 is selected and filled with soil and then a seed, seedling or small plant 16 is placed therein. Then one or more support clips 10 are attached around the rim 12 of the container 14 at appropriate staggered distances. To attach, the generous hook 18 is placed over the rim 12 such that a flange 34 is placed against the inside wall 36 of the pot. The top 38 of the hook 18 rests on the rim 12 of the pot and the support leg 20 rests against the outside wall 40 of the container 14.

The receptacle 24 for the support stake 28 rests against the support leg 20 unless the angle is adjusted through activation of the adjustment knob 30 so that the angle 32 of the receptacle is appropriate for the angle of the support stake 28 relative to the growth stage of the plant 16 planted therein. A support stake 28 is then placed into the space 26 of the receptacle 28. Depending on the plant 16 in the container 14, the plant 16 can then be optionally attached to the support stakes 28 or the stakes 28 can serve as boundaries for the upward growth of the plant 16.

The support clips 10 can also be used on any planting container that has an inside wall, an outside wall and a top rim, including buckets, nursery pots and raised bed planks.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A support clip for supporting support stakes for potted plants comprising:
    a top hook for placement on a rim of a container for potted plants, said top hook having a vertical flange and a horizontal flange wherein said vertical flange rests against an inside wall of said container and said horizontal flange rests on said rim of said container;
    a support leg attached to said top hook wherein said support leg extends downward from said top hook and wherein said support leg rests against an outside wall of said container;
    a receptacle containing an interior space for the placement therein of a support stake wherein said receptacle is attached at a hinged attachment point to said top hook and said support leg at a position where said top hook and said support leg connect wherein said receptacle is angle-able away from said outside wall of said container at said hinged attachment point; and
    an adjustable knob at said position where said top hook and said support leg connect that allows for said receptacle to vary its angle relative to said outside wall of said container wherein said receptacle is positioned outside of said outside wall of said container.

2. A method of supporting a plant inside a planting container comprising the steps of:
    acquiring a container, said container having an inner wall, an outer wall and a top rim extending along a perimeter of said container;
    planting a seed, seedling or plant into said container;
    attaching one or more support clips to said top rim of said container, said one or more support clips further comprising:
        a top hook for placement on said top rim of said container, said top hook having a vertical flange and a horizontal flange positioned substantially perpendicular to each other;
        a support leg attached to said top hook wherein said support leg extends downward from said top hook to rest against said outer wall of said container;
        a receptacle containing an interior space wherein said receptacle is attached at a hinged attachment point to said top hook and said support leg at a position where said top hook and said support leg connect wherein said receptacle is angle-able away from said outer wall of said container at said hinged attachment point; and
        an adjustable knob at said position where said top hook and said support leg connect that allows for said receptacle to vary an angle relative to said outer wall of said container wherein said receptacle is positioned outside of said outer wall of said container;
    wherein said vertical flange of said top hook rests against said inner wall of said container and said horizontal flange rests on said top rim of said container;
    placing of a support stake into said interior space of said receptacle to support said seed, seedling or plant; and
    adjusting an angle of said receptacle and said support leg as desired so as to direct the position of said support stake relative to said outer wall of said container.

\* \* \* \* \*